United States Patent [19]
Goodwin, III et al.

[11] Patent Number: 5,794,211
[45] Date of Patent: Aug. 11, 1998

[54] EPL PRICE VERIFICATION SYSTEM AND METHOD

[75] Inventors: John C. Goodwin, III, Suwanee; Terry L. Zimmerman, Lawrenceville, both of Ga.

[73] Assignee: NCR Corporation, Dayton, Ohio

[21] Appl. No.: 490,041

[22] Filed: Jun. 13, 1995

[51] Int. Cl.$^6$ .................................................. G06F 17/60
[52] U.S. Cl. .................................. 705/23; 705/20; 705/16
[58] Field of Search ............................... 340/825.35; 345/1, 345/2; 235/383, 385; 364/464.01; 395/201, 216, 220, 223, 228

[56] References Cited

U.S. PATENT DOCUMENTS

| | | |
|---|---|---|
| 5,072,381 | 12/1991 | Richardson et al. |
| 5,198,644 | 3/1993 | Pfeiffer et al. ............................ 235/383 |
| 5,260,936 | 11/1993 | Bardet et al. |
| 5,461,561 | 10/1995 | Ackerman et al. ........................ 235/383 |
| 5,493,107 | 2/1996 | Gupta et al. ............................. 235/383 |
| 5,526,267 | 6/1996 | Sogawa. |
| 5,537,126 | 7/1996 | Kayser et al. ............................... 345/1 |
| 5,539,393 | 7/1996 | Barfod ................................ 340/825.35 |
| 5,572,653 | 11/1996 | DeTemple et al. ....................... 235/383 |

*Primary Examiner*—Robert A. Weinhardt
*Attorney, Agent, or Firm*—Paul W. Martin

[57] ABSTRACT

An electronic price label (EPL) price verification system which ensures that a price for an item obtained from a price look-up (PLU) file by a bar code scanner is equal to another price displayed by an electronic price label (EPL) for the item. The EPL price verification system includes a computer system coupled to the EPL, which includes a terminal and a storage medium coupled to the terminal. The storage medium contains an EPL data file, which contains EPL identification information and an EPL price verifier. The computer terminal executes a price verification program which reads the PLU file to obtain the price of the item, calculates another price verifier from the price of the item in the price file, reads EPL data file to obtain the one price verifier, compares the one and the other price verifiers to determine whether they are equal, and changes the displayed price to the price in the PLU file if the one and the other price verifiers are different.

4 Claims, 3 Drawing Sheets

EPL PRICE VERIFICATION SYSTEM AND METHOD

BACKGROUND OF THE INVENTION

The present invention relates to electronic price label (EPL) systems, and more specifically to an electronic price label (EPL) price verification system and method.

In a traditional retail store, bar code scanners rely on price information maintained within a price-lookup (PLU) file. The PLU file is typically stored in a single location at host server.

EPL systems typically include a plurality of EPLs for each merchandise item in a store. EPLs display the price of corresponding merchandise items on store shelves and are typically attached to a rail along the leading edge of the shelves. A store may contain thousands of EPLs to display the prices of the merchandise items. The EPLS are coupled to a central server from where information about the EPLs is typically maintained in an EPL data file. The EPL data file contains EPL identification information, EPL merchandise item information, and price verifier information, such as, a checksum value. Price information displayed by the EPLs is obtained from the PLU file.

Price mismatch can occur in EPLs if the price in the PLU data file has a checksum value that is different than the checksum value in the EPL data file. One situation that can produce price mismatch between the PLU data file and the EPL data file is when either the PLU data file or the EPL data file is lost due to a failure in a storage medium containing the lost file.

The typical method of recovering from such a price mismatch situation is to create and execute price change requests for every EPL in the store. Such price change requests can take hours to accomplish. In stores having thousands of EPLS, this method is inefficient because it changes the prices of EPLs that do not suffer from price mismatch.

Therefore, it would be desirable to provide an EPL price verification system and method which can ensure that the price information in the PLU file is the same price information that is displayed by the EPLS, and which obviates the need to change the prices of all EPLs when price mismatch occurs in less than all of the EPLS.

SUMMARY OF THE INVENTION

In accordance with the teachings of the present invention, an electronic price label (EPL) price verification system and method are provided. The EPL price verification system includes a computer system coupled to the EPL, which includes a terminal and a storage medium coupled to the terminal. The storage medium contains an EPL data file, which contains EPL identification information and an EPL price verifier. The computer terminal executes a price verification program which reads the PLU file to obtain the price of the item, calculates another price verifier from the price of the item in the PLU file, reads EPL data file to obtain the one price verifier, compares the one and the other price verifiers to determine whether they are equal, and changes the displayed price to the price in the PLU file if the one and the other price verifiers are different.

The method of the present invention includes the steps of reading an electronic price label data file to obtain identification information and a price verifier for the item, reading the price file to obtain the price of the item, calculating another price verifier from the price of the item in the price file, comparing the one and the other price verifiers to determine whether they are equal, and changing the displayed price to the price if the one and the other price verifiers are different.

It is accordingly an object of the present invention to provide an electronic price label (EPL) price over function system and method.

It is another object of the present invention to provide an electronic price label (EPL) price verification system and method which ensure that a price for an item obtained from a price look-up (PLU) file by a bar code scanner is equal to another price displayed by an electronic price label (EPL) for the item.

BRIEF DESCRIPTION OF THE DRAWING

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
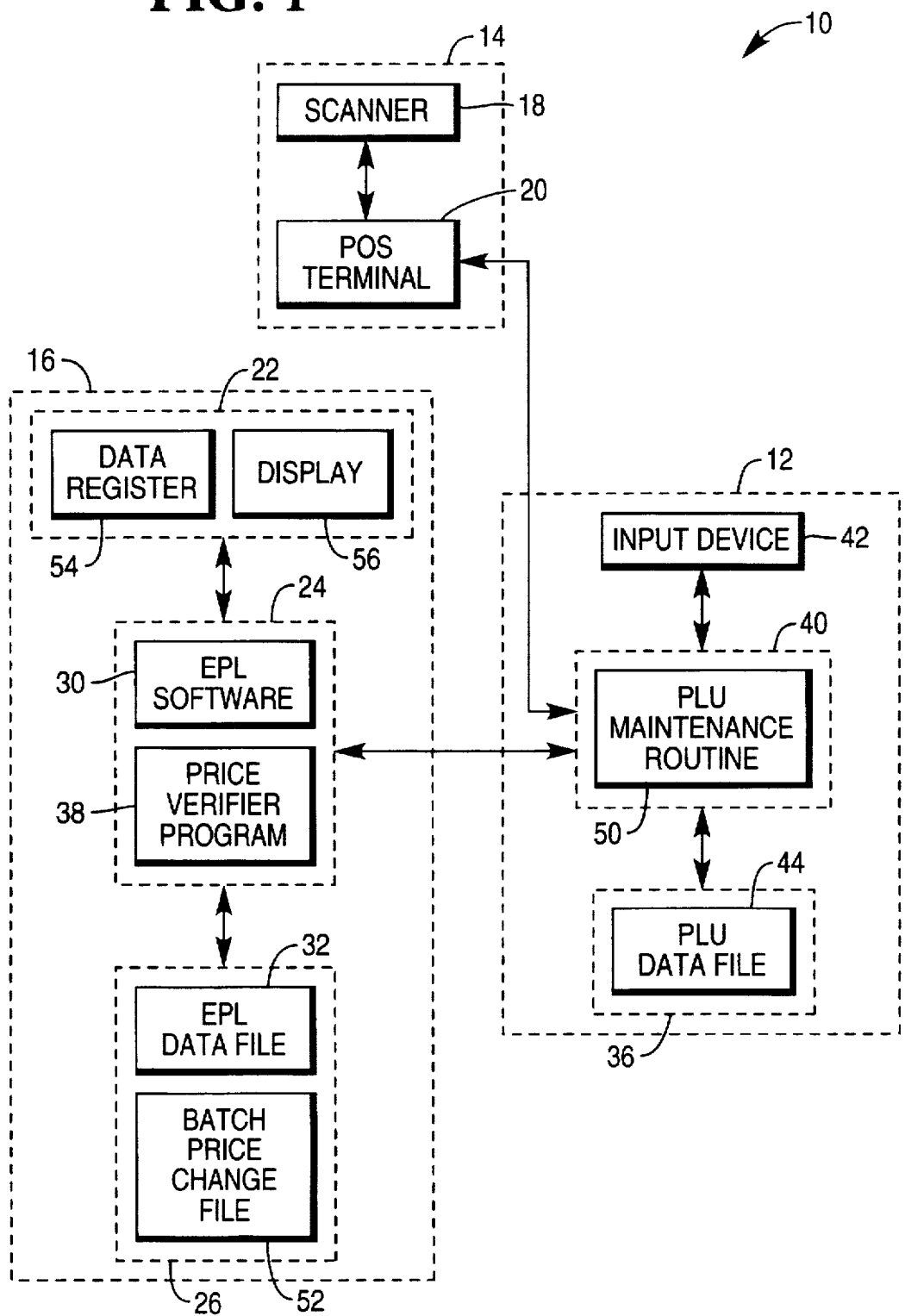
FIG. 1 is a block diagram of a transaction management system.

Referring now to FIG. 1, store system 10 primarily includes host computer system 12, point-of-service (POS) system 14, and EPL system 16.

POS system 14 includes bar code scanner 18 and terminal 20.

EPL system 16 primarily includes EPLs 22, host EPL terminal 24, and EPL storage medium 26.

EPLs 22 are typically attached to shelves within a store and include a data register 54 and a display 56. Data registers 54 contain data, usually the price of an item associated with an EPL on the shelves. The data is typically displayed by display 56.

Host EPL terminal 24 executes EPL software 30, which maintains the contents of EPL data file 32. Host EPL terminal 24 also executes price verifier software 38, which is responsible for verifying that prices displayed by EPLs 22 for items stored within EPL data file 32 are the same as prices for those items contained within PLU data file 44. Price verifier software 38 calculates price checksum values from the price information within PLU data file 44.

EPL storage medium 26 stores EPL data file 32 and is preferably a fixed disk drive.

Host computer system 12 includes PLU storage medium 36, host PLU terminal 40, and input device 42.

PLU storage medium 36 stores PLU data file 44. PLU file 44 is preferably the sole location for storing item prices and is available for distribution to POS terminal 20 by host PLU terminal 40. Alternatively, provision may be made for bar code scanner 18 to directly access primary PLU file 44 from host PLU terminal 40.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals.

Host PLU terminal 40 executes PLU maintenance routine 50. PLU maintenance routine 50 updates PLU file 44, prepares system 12 for a loss of PLU data file 44, and executes PLU data recovery procedures.

Input device 42 is preferably a keyboard.

PLU maintenance routine 50 may send changes in price in PLU file 44 directly to EPL terminal 24 and POS terminal 20 as they are entered in input device 42 (immediate processing) or store price changes within a batch file 52 in EPL storage medium 26 for later batch updating (batch processing).

Figure 2:
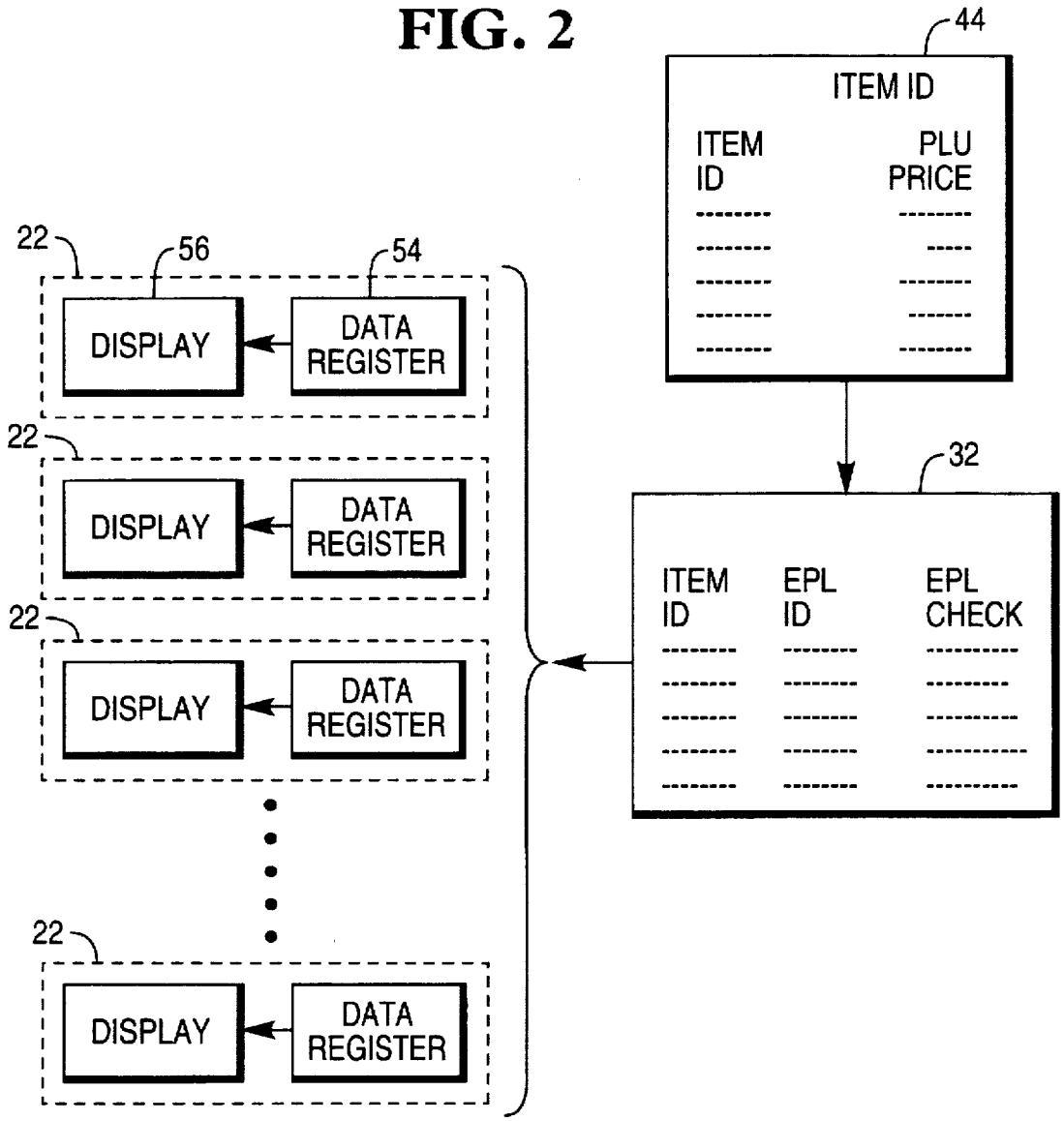
FIG. 2 is a diagram of the information within the PLU data file and the EPL data file.

Turning now to FIG. 2, EPL data file 32 and PLU data file 44 are shown in more detail. EPL data file 32 includes a line entry for each EPL 22 in EPL system 16. Each line entry has an item identification entry (ITEM ID), an EPL identification entry (EPL ID), and an EPL price checksum value entry (EPL CHECK).

Entry ITEM ID identifies a store item. Entry EPL ID identifies which EPL is assigned to the item. Entry EPL CHECK is a checksum value of the digits of the price information that is displayed by display 56.

PLU data file 44 includes a line entry for each item sold in the store. Each line entry has an item identification entry (ITEM ID), and a PLU price entry (PLU PRICE).

Entry ITEM ID identifies a store item. Entry PLU PRICE identifies the price read by POS system 14 to determine the price of each item during scanning by bar code scanner 18.

During normal operation, EPL terminal 24 obtains price information from PLU data file 44 and sends it to data register 54. Display 56 displays the price in data register 54. During a price mismatch situation, the price information from PLU data file 44 does not agree with the price displayed by EPL. Price verifier software 38 compares the price PLU file 44 with the price displayed by EPLs 22 by comparing entry EPL CHECK in EPL data file 32 with a checksum value it generates from the corresponding price in entry PLU PRICE.

Figure 3:
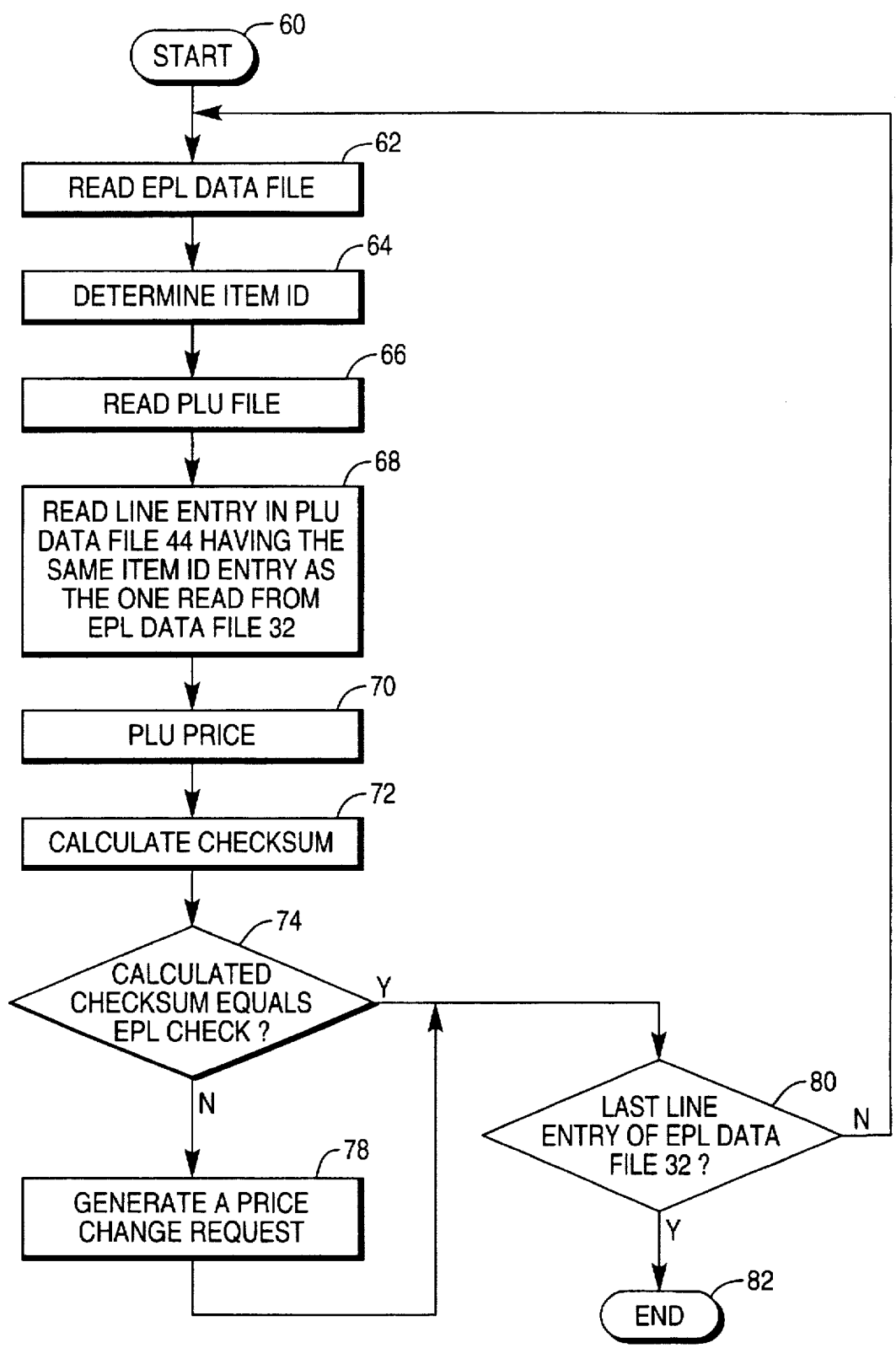
FIG. 3 is a flow diagram of the price verification method of the present invention.

Turning now to FIG. 3, the price verification method of the present invention begins with START 60.

In step 62, price verifier software 38 reads EPL data file 32.

In step 64, price verifier software 38 examines entry ITEM ID.

In step 66, price verifier software 38 reads PLU data file 44.

In step 68, price verifier software 38 reads the line entry in PLU data file 44 having the same ITEM ID entry as the one read from EPL data file 32.

In step 70, price verifier software 38 examines entry PLU PRICE in the line entry from PLU data file 44.

In step 72, price verifier software 38 calculates a checksum value for PLU PRICE.

In step 74, price verifier software 38 compares the calculated checksum value for entry PLU PRICE with the entry EPL CHECK. If the calculated checksum value is not the same as the EPL CHECK entry, the price for the item having ITEM ID is not the same in both EPL data file 32 and PLU data file 44. Price mismatch has occurred between the price for the item displayed by its EPL and the price that would be tallied by POS system 14.

In step 78, price verifier program 38 generates a price change request for changing the displayed price to the PLU price and updates the checksum value in entry EPL CHECK in EPL data file 32. This request may by an immediate request or part of a batch of requests stored in batch price change file 52.

In step 80, the method determines whether the last line entry of EPL data file 32 has been read. If so, the method ends at step 82. If not, the method returns to step 62 to read another line entry from EPL data file 32.

Returning to step 74, if the calculated checksum value is the same as the EPL CHECK entry, the price for the item having ITEM ID is the same in both EPL data file 32 and PLU data file 44. Price mismatch has not occurred between the price for the item displayed by its EPL and the price that would be tallied by POS system 14. The method proceeds to step 80.

The price verification method of the present invention may be performed at any time. It is preferable to perform the price verification after a loss of either the EPL data file or the PLU data file.

Although the present invention has been described with particular reference to certain preferred embodiments thereof, variations and modifications of the present invention can be effected within the spirit and scope of the following claims.

What is claimed is:

1. A method of ensuring that a price for an item obtained from a price file by a bar code scanner is equal to another price assigned to an electronic price label for the item for display by the electronic price label, comprising the steps of:

(a) reading an electronic price label data file to obtain identification information and a price verifier for the item;

(b) reading the price file to obtain the price of the item using the identification information obtained from the electronic price label data file;

(c) calculating another price verifier from the price of the item in the price file;

(d) comparing the one and the other price verifiers to determine whether they are equal; and (e) changing the displayed price to the price if the one and the other price verifiers are different.

2. A method of ensuring that a price for an item obtained from a price look-up (PLU) file by a bar code scanner is equal to another price assigned to an electronic price label for the item for display by the electronic price label, comprising the steps of:

(a) providing an electronic price label data file including a record associated with the electronic price label;

(b) storing identification information for the item in the record;

(c) determining a price checksum value for the item from the displayed price;

(d) storing the price checksum value in the electronic price label data file;

(e) reading the record in the electronic price label data file to obtain the identification information and the price checksum value for the item;

(f) reading the price file to obtain the price of the item using the identification information obtained from the electronic price label data file;

(g) calculating another price checksum value from the price of the item in the price file;

(h) comparing the one and the other price checksum values to determine whether the one and the other price checksum values are equal; and (i) changing the displayed price to the price if the one and the other price checksum values are different.

3. A system for ensuring that a price for an item obtained from a price look-up (PLU) file by a bar code scanner is equal to another price assigned to an electronic price label (EPL) for the item for display by the EPL, comprising:

a computer system coupled to the EPL, including a terminal and a storage medium coupled to the terminal;

wherein the storage medium contains an EPL data file, which contains identification information and an price verifier for the item;

wherein the computer terminal reads the PLU file to obtain the price of the item, calculates another price verifier from the price of the item in the price file, reads the EPL data file to obtain the one price verifier, compares the one and the other price verifiers to determine whether they are equal, and changes the displayed price to the price in the PLU file if the one and the other price verifiers are different.

4. A system for ensuring that a price for an item obtained from a price look-up (PLU) file by a bar code scanner is equal to another price assigned to an electronic price label (EPL) for the item for display by the EPL, comprising:

a computer system coupled to the EPL, including a terminal and a storage medium coupled to the terminal;

wherein the storage medium contains an EPL data file including a record associated with the EPL;

wherein the computer terminal stores identification information for the item in the record, determines a price checksum value for the item from the displayed price, stores the price checksum value in the EPL data file, reads the record in the EPL data file to obtain the identification information and the price checksum value for the item, reads the price file to obtain the price of the item using the identification information obtained from the electronic price label data file, calculates another price checksum value from the price of the item in the price file, compares the one and the other price checksum values to determine whether the one and the other price checksum values are equal, and changes the displayed price to the price if the one and the other price checksum values are different.

* * * * *